United States Patent
Verschueren et al.

(10) Patent No.: US 11,465,921 B2
(45) Date of Patent: Oct. 11, 2022

(54) ELECTROSORPTION PURIFICATION SYSTEM WITH BATTERY DRIVEN REGENERATION

(71) Applicant: KONINKLIJKE PHILIPS N.V., Eindhoven (NL)

(72) Inventors: Alwin Rogier Martijn Verschueren, Eindhoven (NL); Joldert Maria Boersma, Eindhoven (NL); Klaas Kooijker, Eindhoven (NL); Gertrude Rioette Van Der Kamp, Eindhoven (NL); Ytsen Wielstra, Eindhoven (NL); Paulus Cornelis Duineveld, Eindhoven (NL); Franciscus Maria Johannes Van Roemburg, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 253 days.

(21) Appl. No.: 15/560,315

(22) PCT Filed: Mar. 16, 2016

(86) PCT No.: PCT/EP2016/055618
§ 371 (c)(1),
(2) Date: Sep. 21, 2017

(87) PCT Pub. No.: WO2016/156038
PCT Pub. Date: Oct. 6, 2016

(65) Prior Publication Data
US 2018/0065870 A1    Mar. 8, 2018

(30) Foreign Application Priority Data
Apr. 3, 2015  (EP) .................................. 15248034

(51) Int. Cl.
*C02F 1/469*  (2006.01)
*C02F 1/46*  (2006.01)

(52) U.S. Cl.
CPC .......... *C02F 1/4691* (2013.01); *C02F 1/4602* (2013.01); *C02F 2201/4614* (2013.01);
(Continued)

(58) Field of Classification Search
CPC ........ C02F 1/4691; C02F 9/005; C02F 1/002; C02F 1/003; C02F 2307/02;
(Continued)

(56) References Cited

U.S. PATENT DOCUMENTS 6,309,532 B1 * 10/2001 Tran ......................... B01J 47/08
                                                              204/267
8,562,803 B2    10/2013 Nyberg
(Continued)

FOREIGN PATENT DOCUMENTS

CN          1505700 A       6/2004
CN        101980968 A       2/2011
(Continued)

OTHER PUBLICATIONS

Johnson & Newman, "Desalting by Means of Porous Carbon Electrodes", J Electrochem. Soc. vol. 118, No. 3 (1971), pp. 510-517.
(Continued)

*Primary Examiner* — Salil Jain

(57) ABSTRACT

The invention provides an electronic domestic appliance (1000) comprising a decalcifying apparatus (1) for purifying an aqueous liquid, wherein the electronic domestic appliance (1000) comprises an electronic connector (110) for connecting to an external AC power source wherein the electronic connector (110) is functionally coupled with the DC power supply (100), the electronic domestic appliance
(Continued)

(1000) further comprising a functional element (1600) wherein purified aqueous liquid is applied and/or stored.

14 Claims, 7 Drawing Sheets

(52) U.S. Cl.
CPC ............ *C02F 2201/46135* (2013.01); *C02F 2201/46165* (2013.01); *C02F 2303/16* (2013.01); *C02F 2307/04* (2013.01); *C02F 2307/12* (2013.01)

(58) Field of Classification Search
CPC ............ C02F 2307/04; C02F 2307/06; C02F 2307/10; C02F 2307/12; C02F 2201/46165; C02F 2201/4617
See application file for complete search history.

(56) References Cited

U.S. PATENT DOCUMENTS

| | | | | |
|---|---|---|---|---|
| 8,872,130 | B1 * | 10/2014 | Matthews | C02F 1/325 250/455.11 |
| 2002/0167782 | A1 * | 11/2002 | Andelman | C02F 1/008 361/302 |
| 2004/0188246 | A1 | 9/2004 | Tran | |
| 2010/0044244 | A1 | 2/2010 | Lee | |
| 2011/0042206 | A1 * | 2/2011 | Tanahashi | C02F 1/4602 204/278.5 |
| 2011/0240472 | A1 | 10/2011 | Seed | |
| 2013/0118918 | A1 * | 5/2013 | Servida | C02F 1/4691 205/744 |
| 2016/0221837 | A1 * | 8/2016 | Chang | C02F 1/441 |

FOREIGN PATENT DOCUMENTS

| | | |
|---|---|---|
| CN | 104203063 A | 12/2014 |
| EP | 505082 A2 | 9/1992 |

OTHER PUBLICATIONS

Office Action issued in connection with corresponding EP application No. 16713755.3 dated Jun. 21, 2018, 5 pages.
Keddam, M., et al., "The concept of floating electrode for contactless electrochemical measurements: Application to reinforcing steel-bar corrosion in concrete", Corrosion Science, vol. 51, Issue 8, pp. 1795-1801 (Aug. 2009).

* cited by examiner

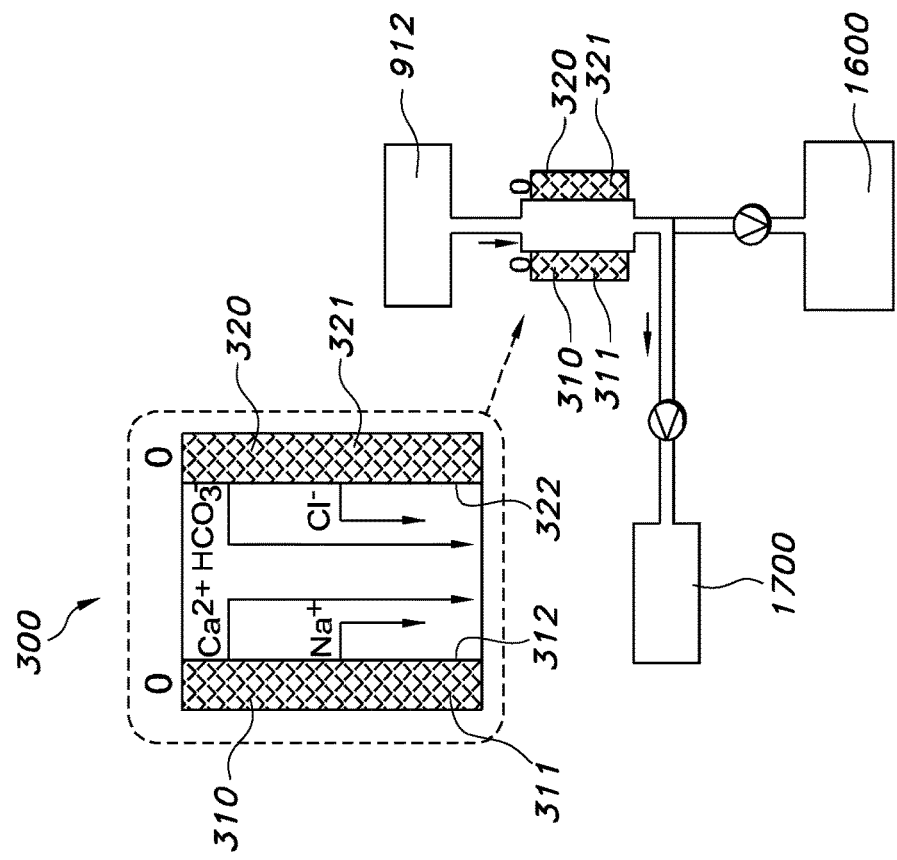
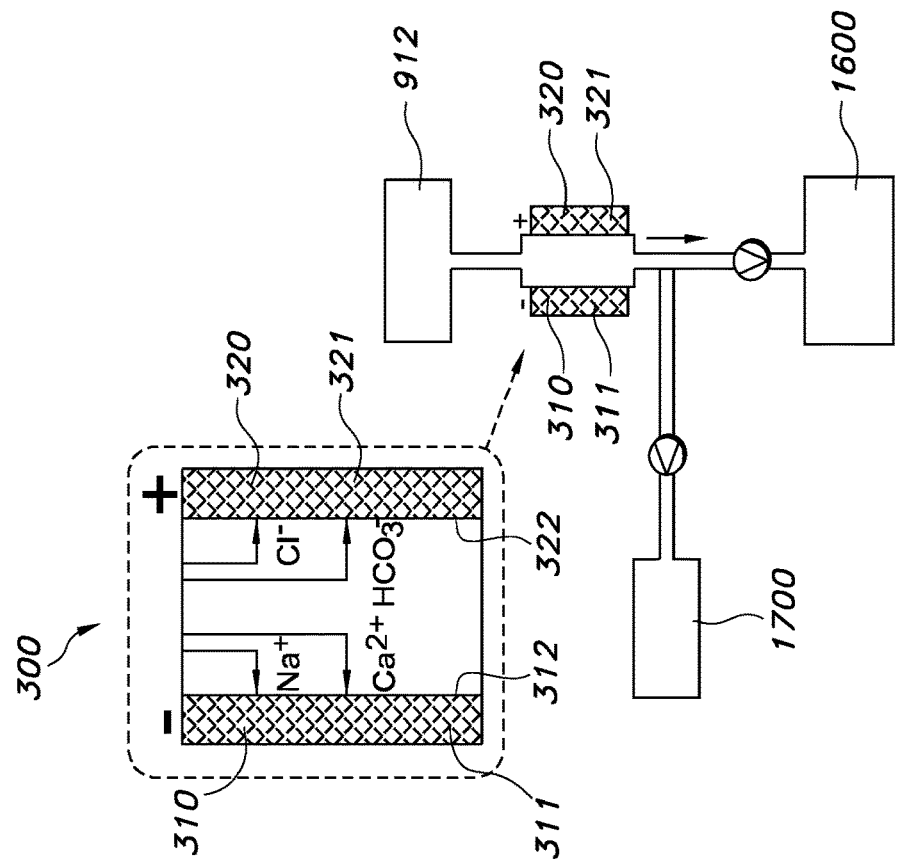
FIG. 3A
FIG. 3B

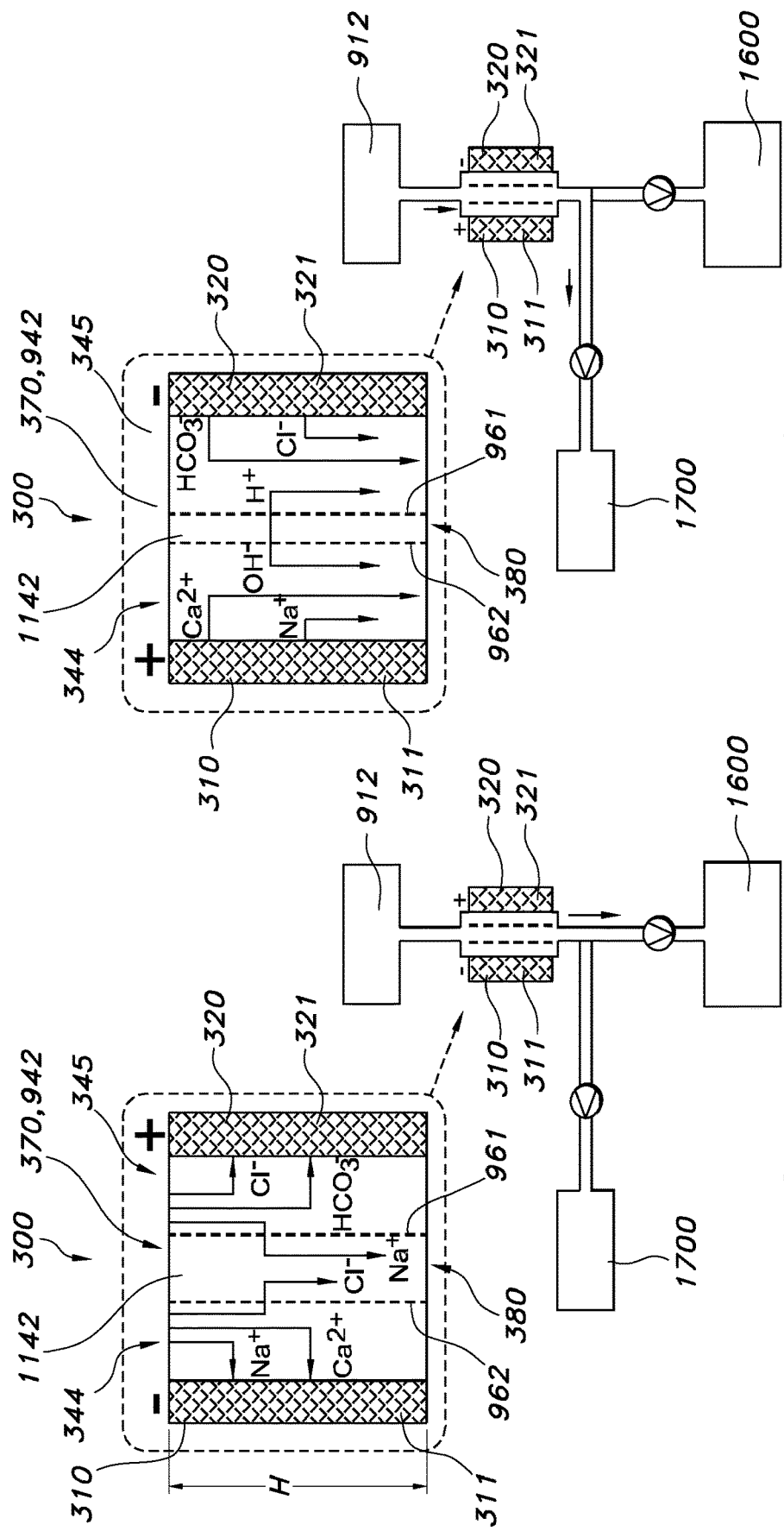

ELECTROSORPTION PURIFICATION SYSTEM WITH BATTERY DRIVEN REGENERATION

This application is the U.S. National Phase application under 35 U.S.C. § 371 of International Application No. PCT/EP2016/055618, filed on Mar. 16, 2016, which claims the benefit of International Application No. 15248034.9 filed on Apr. 3, 2015. These applications are hereby incorporated by reference herein.

FIELD OF THE INVENTION

The invention relates to a decalcifying apparatus. The invention further relates to an electronic domestic appliance comprising such decalcifying apparatus.

BACKGROUND OF THE INVENTION

Electrochemical treatments of fluids are known in the art. U.S. Pat. No. 8,562,803, for instance, describes a fluid treatment apparatus for treating a fluid which apparatus comprises an electrochemical cell having fluid orifices to receive and release fluid, and a fluid passageway connecting the orifices with a water-splitting ion exchange membrane which is exposed to the fluid in the passageway. First and second electrodes are positioned about the membrane. The apparatus also comprises a controller to control and operate a power supply and valve system. The power supply supplies a current to the first and second electrodes at sufficiently high current density to result in bacteriostasis, deactivation, or a reduction in the microorganisms in the fluid. The controller can also operate a set of cells to deionize fluid and regenerate the cells.

U.S. Pat. No. 6,309,532 describes an electrically regeneratable electrochemical cell for capacitive deionization and electrochemical purification and regeneration of electrodes that includes two end plates, one at each end of the cell. A regeneration method is applied to the cell which includes slowing or stopping the purification cycle, electrically desorbing contaminants and removing the desorbed contaminants. The cell further includes a plurality of generally identical double-sided intermediate electrodes that are equidistally separated from each other, between the two end electrodes. As the electrolyte enters the cell, it flows through a continuous open serpentine channel defined by the electrodes, substantially parallel to the surfaces of the electrodes. By polarizing the cell, ions are removed from the electrolyte and are held in the electric double layers formed at the carbon aerogel surfaces of the electrodes. The cell is regenerated electrically to desorb such previously removed ions.

SUMMARY OF THE INVENTION

Scale formation, also known as calcification, is an issue in many household appliances that use water, in particular hard tap water. Repeated use of these household appliances causes a build up of scale which can dramatically reduce the efficiency or quality of the function provided by the appliance. To avoid this reduced functionality and prevent malfunction, regular cleaning is required to remove the scale, also known as descaling, decalcifying or decalcification. Consequences of failing to descale devices may include, for example, formation of scale in coffee makers blocking the fluid flow or insulating the heating element. In steam irons scaling may lead to brownish coloured water being spat onto garments. Furthermore, hard tap water used in air humidifiers based on ultrasonic transducers may spread white scaling dust.

It is known to provide a decalcifying apparatus with disposable cartridges, for example by means of ion exchange resins. Ion exchange resins decalcify water by substituting calcium and magnesium ions with sodium or potassium ions. However, the resins replace calcium and magnesium ions in water with sodium ions, which makes the treated water very sodium rich. Sodium rich water is generally not suitable for making tea, soy milk or diluting powder baby milk.

Alternatively, electrosorption may be used to treat water. Positive ions (for example, calcium ($Ca^{2+}$)) and negative ions (for example, bicarbonate ($HCO_3^-$)) are captured by electrodes driven by an electric potential applied between both electrodes. Electrosorption (also referred to as CDI (capacitive de-ionisation)) is a known technology that uses electric fields to reversibly capture ions inside a porous electrode (mostly active carbon). Electrosorption is typically operated as a batch process, consisting of a purification mode and a regeneration mode. In the purification mode, the potentials in the electrosorption cell are applied such that ions from the input water are adsorbed. Then the purified water leaving the cell is pumped to the output branch. In the regeneration mode, the electrosorption cell is operated either by an electrical shortcut or preferably at reverse polarity, such that previously captured ions are actively desorbed again. Then the water with enriched ion concentration leaving the cell is pumped to the waste branch.

A disadvantage of the conventional electrosorption batch process is that during regeneration mode there is no (purified) water supply to the application. So for instance, when embedded in a coffee maker or steam iron, this means that the user will have to wait for the regeneration process to be completed before being able to continue with ironing or brewing coffee.

Further, it is a desire to provide, amongst others, a (domestic) appliance that may be used cordless and/or may especially also be regenerated cordless.

Hence, it is an aspect of the invention to provide an alternative decalcifying apparatus, which preferably further at least partly obviates one or more of above-described drawbacks and/or provides one or more of the above indicated desired functionalities. Yet it is also an aspect of the invention to provide an alternative electronic (domestic) appliance, comprising such decalcifying apparatus, which preferably further at least partly obviates one or more of above-described drawbacks and/or provides one or more of the above indicated desired functionalities.

Amongst others, it is herein suggested to include a rechargeable battery inside the appliance to allow for automatic regeneration when the device has been switched off by the user. This allows a cordless regeneration of the electrosorption cell. It further allows the charging of the battery during a purification stage, when purification is terminated, the charged battery can be used to regenerate the electrosorption cell. Further, it advantageously appears that with the battery a DC power supply may be applied providing a lower current, as the battery may be configured to provide part of the electrical current, also during the purification stage. For instance, it might be necessary to provide a power surge. In such instance, the battery may assist also during the purification stage. Further, this may also allow reducing the performance specification on the DC power supply to deliver time-averaged required current instead of peak current, thereby reducing cost, weight and volume of the appliance.

Hence, in a first aspect the invention provides a decalcifying apparatus (herein further also indicated as "apparatus") configured to decalcify an aqueous liquid ("liquid"), wherein the decalcifying apparatus comprises:

a DC power supply configured to convert AC power from an external AC power source into DC power;

a battery unit comprising a rechargeable battery (herein also indicated as "battery");

an electrosorption cell unit comprising a treatment section for said aqueous liquid, wherein the treatment section comprises: (a) a first electrosorption electrode arrangement comprising a first electrosorption electrode, (b) a second electrosorption electrode arrangement comprising a second electrosorption electrode, and (c) a first treatment section opening for introduction of the aqueous liquid;

wherein the decalcifying apparatus is configured to operate during part of its operation time in a purification stage wherein a first DC potential difference between the first electrosorption electrode and the second electrosorption electrode is applied especially using one or more of (i) the DC power supply; and (ii) the rechargeable battery; and wherein the decalcifying apparatus is configured to operate during part of its operation time in a regeneration stage wherein (a) a DC potential difference between the first electrosorption electrode and the second electrosorption electrode is applied especially using the rechargeable battery, wherein the second DC potential difference has a sign opposite of the first DC potential difference, or (b) wherein the first electrosorption electrode and the second electrosorption electrode are electrically short circuited.

With this apparatus it is possible to help providing simple and efficient decalcification of an aqueous solution (such as hard water), for example in a household appliance. Therefore, the formation of scale in an apparatus is minimised and so the performance of an appliance may be enhanced and its operational lifetime increased. Further, with this apparatus it is relatively easily possible to regenerate when the apparatus is not used for purification, such as during the night, with the battery providing the power. Further, this regeneration may also be executed in a cordless and unpowered stage. Further, with the present apparatus it is possible to purify an aqueous liquid without substantial formation of waste water (during the regeneration stage), as the present apparatus uses in embodiments an electrosorption cell especially including an ion generating element interposed between two cell parts (see further below). The "aqueous liquid" will in general be an aqueous solution, and is therefore herein also indicated as "aqueous solution".

The apparatus can be used in at least two modes or stages: a purification stage, wherein cations and/or anions may be removed from the aqueous liquid, and a regeneration stage, wherein the adsorbed ions are released from the electrosorption electrodes. Dependent upon the configuration of the apparatus, the stages may be executed sequentially (especially when there is only one electrosorption cell), or the stages may be executed simultaneously (especially when there are more than one electrosorption cells). In the purification stage, ions like the calcium ion and/or the bicarbonate ion may be removed from the aqueous liquid, to provide purified aqueous liquid. In the regeneration stage, ions like the calcium ion and/or bicarbonate ion may be released from the electrosorption electrodes, leading to waste liquid. The liquid herein is especially water, even more especially water comprising ions (such as one or more of calcium, sodium, chloride, and bicarbonate), such as is the case with e.g. hard water.

The driving force in purification is a potential difference between the electrodes. Hence, to this end the apparatus comprises a DC power supply. The DC power supply may especially be configured to provide a voltage difference selected from the range of 0.5-40 V, such as in the range of 1-10 V, like 1-3 V. The power supply is configured to convert AC power from an external AC power source into the DC power.

The (external) AC power source is thus especially not comprised by the apparatus (or appliance). Nevertheless, the DC power supply may be configured in functional connection with a receiver for cordless AC powering. Such receiver for cordless AC powering may be included in the apparatus and may in an embodiment especially be based on inductive and/or capacitive coupling. During operation, the receiver may e.g. be powered by the external AC source, and this power is converted into DC power by the DC power supply. Alternatively or additionally, the apparatus may also include a wired connector, such as an electronic plug for arrangement in an AC mains socket (i.e.: an external AC power source).

Further, the DC power supply may be configured to provide a current in the range of 0.5-10 A, such as in the range of 0.5-8 A, like 0.5-6 A. The choice of the current may amongst others depend upon the function of the battery during purification (see above, and also below). Hence, the apparatus comprises a DC power supply configured to convert AC power from an external AC power source into DC power.

Herein, phrases like "configured to provide a voltage difference selected from the range of 0.5-40 V" or "configured to provide a current in the range of 0.5-10 A", and similar phrases, indicate amongst others the maximum voltage or current that may be generated with the relevant device (such as the DC power supply and the rechargeable battery). Such phrases do not imply that a voltage difference of 40 V or a current of 10 A is applied (always), but especially indicated that the apparatus is able to provide such voltage difference and/or current, respectively, etc.

Further, the apparatus comprises a battery unit comprising a rechargeable battery. In principle this can be any rechargeable battery. Especially however, the battery may be configured to provide a voltage difference selected from the range of 0.5-40 V, such as in the range of 1-10 V, such as 1-3 V. Further, especially the battery may be configured to provide a current in the range of 0.5-10 A, such as in the range of 0.5-8 A, like in the range of 0.5-6 A. As also indicated above, phrases like "configured to provide a voltage difference selected from the range of 0.5-40 V" or "configured to provide a current in the range of 0.5-10 A" and similar phrases indicate the maximum voltage or current that may be generated with the relevant device. In view of the rechargeable battery, this especially refers to the technical features of the battery when substantially fully charged. The battery can for instance comprise a galvanic cell, for instance lithium ion battery, or a super capacitor. The term "rechargeable battery" may also refer to a plurality of rechargeable batteries (parallel arranged and/or in series arranged).

In an embodiment, the decalcifying apparatus is especially configured to charge the rechargeable battery via the DC power supply during at least part of a purification stage. Alternatively or additionally, the decalcifying apparatus is especially configured to charge the rechargeable battery (via the DC power supply) during a stand by stage (or optionally otherwise idle stage).

Hence, during purification a voltage difference is applied to the electrosorption cell unit, or more precisely the electrosorption electrodes. The rechargeable battery is especially functionally integrated in an electrical circuit also comprising the electrosorption cell unit and the DC power supply. For instance, the battery and the electrosorption cell unit may be arranged parallel (at least during the purification stage), i.e. both being subject to the same voltage difference.

Further, the apparatus comprises an electrosorption cell unit. In this unit, the aqueous liquid is purified, during the purification stage, but in this unit, also the electrosorption cell may be regenerated, leading to waste liquid (the waste liquid may be stored, see also below). The electrosorption cell unit comprises a treatment section for said aqueous liquid. The treatment section especially comprises (a) a first electrosorption electrode arrangement comprising a first electrosorption electrode, (b) a second electrosorption electrode arrangement comprising a second electrosorption electrode, and (c) a first treatment section opening for introduction of the aqueous liquid. Herein, the term "first electrode arrangement", "second electrode arrangement", "first electrosorption electrode", and "second electrosorption electrode", etc., may each independently also refer to a plurality of first electrode arrangements, second electrode arrangements, first electrosorption electrodes, and second electrosorption electrodes, etc. Herein, the term "electrolytic cell unit" refers to a unit comprising the first electrode arrangement and the second electrode arrangement. Especially, these are separated by a treatment space.

Further, between the first electrode arrangement and the second electrode arrangement, optionally an ion generating element (see further also below) may be arranged. The ion generating element may thus be configured to split the electrolytic cell unit (or electrolytic cell section) into two (separate) cells. By using a flow of the aqueous solution through the electrolytic cell unit or by using an isolating arrangement ((optionally) in combination with the ion generating element)(see also below) the two cell parts (of the electrolytic cell unit) may substantially be isolated from each other (though downstream the aqueous liquid from both parts may be combined again). Note that when a water-splitting membrane may be used, the water-splitting membrane may provide a third volume, between the respective two cell parts. This is further elucidated below.

The apparatus as described herein may include a plurality of electrolytic cells, which may in an embodiment be configured in series, in an embodiment be configured parallel, and in yet a further (hybrid) embodiment some of them may be configured in series and some of them may be configured parallel (see further also below).

Note that the first electrosorption electrode and the second electrosorption electrode may especially be arranged parallel to each other. Further these electrodes may in general have a similar height or length. Likewise, the ion generating element (see further also below) may substantially have the same height or length, allowing a layered structure of first electrosorption electrode, space for aqueous solution, ion generating element, space for aqueous solution, and second electrosorption electrode.

As indicated above, the decalcifying apparatus may especially be configured to operate during part of its operation time in a purification stage wherein a first DC potential difference between the first electrosorption electrode and the second electrosorption electrode is applied using one or more of (i) the DC power supply and (ii) the rechargeable battery. Hence, in a first embodiment the potential difference (during at least part of the purification stage) between the electrodes of the electrosorption cell is entirely provided by the DC power supply. In yet a second embodiment, the potential difference (during at least part of the purification stage) between the electrodes of the electrosorption cell is entirely provided by the rechargeable battery. In yet a third embodiment, the potential difference (during at least part of the purification stage) between the electrodes of the electrosorption cell is provided by DC power supply and the rechargeable battery (hence, the DC power supply and the rechargeable battery are especially configured parallel). In general, the first embodiment may be applied. Further, for surge demands, i.e. a temporarily high need for e.g. a (severe) purification, the third embodiment may be applied, i.e. the rechargeable battery (when at least partly charged) may assist the DC power supply. Hence, especially embodiments of the apparatus allowing the use of the rechargeable battery to also provide a (further) potential difference to the electrosorption cell may be of interest. The second embodiment may in general only temporarily be applied, as part of the purification time may be needed to charge the rechargeable battery.

Further, as indicated above, the decalcifying apparatus may especially be configured to operate during part of its operation time in a regeneration stage wherein (a) a DC potential difference between the first electrosorption electrode and the second electrosorption electrode is applied using the rechargeable battery, wherein the second DC potential difference has a sign opposite of the first DC potential difference, or (b) wherein the first electrosorption electrode and the second electrosorption electrode are electrically short circuited. Especially, when these electrodes are short circuited, no potential voltage difference is applied to the first electrosorption electrode and the second electrosorption electrode (with the DC power supply and rechargeable battery).

Hence, in a (first) variant during a regeneration stage a DC potential difference between the first electrosorption electrode and the second electrosorption electrode is applied using the rechargeable battery, wherein the second DC potential difference has a sign opposite of the first DC potential difference. The rechargeable battery is thus charged during the purification stage, and its potential difference is used during regeneration to apply to the electrolytic cell, but such that the potential difference is thus reversed in sign relative to the purification stage (the absolute potential difference value may differ between the purification stage and the regeneration stage, and may also depend upon the capacity, as during e.g. purification, the potential difference needed to purify may increase). In an embodiment, during the initial moments of the regeneration stage, temporarily a DC potential difference of sign equal to that of the purification stage may be applied, be it at reduced magnitude, followed by further reductions in magnitude, and eventually a reversal of polarity will have to take place for effective regeneration.

In yet an alternative (second) variant during a regeneration stage the first electrosorption electrode and the second electrosorption electrode are electrically short circuited. This embodiment may especially be relevant when there is no barrier blocking migration of ions from one electrode to the other electrode. For instance, when using a water splitting membrane, this variant may be of less relevance. In this alternative variant it may not be necessary, but it may be advantageous, when the electrodes include ion selective membranes. Hence, when draining the electrolytic cell (that has been charged with ions) by shortcutting, the ions do not deposit on the opposite electrode. As indicated above, when these electrodes are short circuited, no voltage difference is applied to the first and second electrosorption electrodes.

As indicated above, in a specific embodiment the decalcifying apparatus is configured to operate during part of its operation time in said purification stage wherein said first DC potential difference between the first electrosorption electrode and the second electrosorption electrode is applied using the DC power supply. Hence, the potential difference over the electrodes of the electrolytic cell may in this embodiment be substantially exclusively be provided by the DC power supply.

In yet another embodiment, the decalcifying apparatus may especially be configured to operate during part of its operation time in said purification stage wherein said first DC potential difference between the first electrosorption electrode and the second electrosorption electrode is applied using the DC power supply and the rechargeable battery, wherein the DC power supply is especially configured to provide a lower current than the rechargeable battery. Hence, the potential difference (and current) between the electrodes of the electrolytic cell may in this embodiment be provided by the DC power supply and the rechargeable battery (which may thus be configured parallel). This may especially be of interest to meet power surges. Assume for instance a coffee machine wherein a batch of water has to be purified. A further advantage of this embodiment is that a relative low current DC power supply may be used. Purification may be a matter of time. Hence, with the DC power supply, a steady purification over a longer time may be provided, by which a (buffer) storage (see also below) may be filled, with the rechargeable battery as fallback when suddenly a "lot of" purified water is needed.

The decalcifying apparatus may be configured, in the first operating condition, to apply a voltage between the first electrode arrangement, having a low potential, and the second electrode arrangement, having a high potential, to attract the ions to the electrode arrangements and remove the ions from the aqueous solution, and may be configured, in the second operating condition, to reverse the polarity to apply a voltage between the first and second electrode arrangements with the potentials reversed such that the first electrode arrangement has a high potential and the second electrode arrangement has a low potential to regenerate the ions removed from the aqueous solution.

In yet a further embodiment, the decalcifying apparatus further comprises a current controller configured to control the current through the treatment section during one or more of (i) the purification stage, and (ii) the regeneration stage. The current controller can be used to stabilize the current, especially during purification. The "open cell" voltage of the electrosorption cell steadily increases as the adsorption capacity is gradually being used up. This implies that with constant potential difference applied between both electrosorption electrodes, the resulting electrical current will steadily decrease. Vice versa, during the regeneration stage, the "open cell" voltage will gradually reduce again as the capacity is recovered. This implies that with constant potential difference applied, at reversed polarity, the resulting (absolute) current will steadily decrease towards zero. A constant current ensures a constant degree of ion purification, given a constant mass rate of the liquid handled by the electrosorption cell.

The current controller can be configured to control a positive current and/or a negative current (opposite direct). Especially, the current controller is configured to maximize a current up to (−) 10 A, such as up to (−) 8 A, like up to (−) 5 A. Further, the term "current controller" may also refer to a plurality of (different) current controllers. An example of a suitable current controller is e.g. a (controllable) series resistance, a constant current diode, transistor in either common emitter, source, base, gate or grid configuration or a trans impedance operational amplifier.

Alternatively or additionally, the decalcifying apparatus may further comprise a voltage controller configured to control the voltage difference between the first electrosorption electrode and the second electrosorption electrode during one or more of (i) the purification stage, and (ii) the regeneration stage. Voltages may e.g. be maximized to (−) 40 V, such as (−) 10 V, like (−) 3 V. An example of a control strategy for the voltage controller is to apply between first and second electrosorption electrodes a voltage equal to the summation of a constant voltage and the periodically measured "open cell" voltage in idle stage (see below). Electronics to realize this can for instance be based on an operational amplifier in summing amplifier configuration.

As indicated above, during operation the decalcifying apparatus may execute a purification stage or execute a regeneration stage (or in embodiments both stages in overlapping time frames when the apparatus comprises a plurality of electrosorption cells). However, there may be more stages, like an "off stage" or a "sleep stage". Further, the decalcifying apparatus may also include an "idle stage". The term "idle stage" refers to a stage wherein the apparatus is switched on, but wherein the apparatus is not in a regeneration stage and neither in a purification stage. For instance, the term "idle stage" may refer to a sleep stage. During a sleep stage, the apparatus may substantially be inactive, whereas the term "idle stage" is herein also used to indicate a stage wherein the apparatus may execute other actions than purification and/or regeneration. For instance, the idle stage can be used to evaluate one or more components, such as the status (such as capacity) of the rechargeable battery and/or the status (such as capacity) of the electrosorption cell.

Hence, in an embodiment the decalcifying apparatus is configured to operate during part of its operation time in an idle stage, wherein the electrical current between the first and second electrosorption electrodes is significantly reduced. Especially, the decalcifying apparatus is configured to operate during part of its operation time in an idle stage, wherein either (a) a high impedance is applied between the first electrosorption electrode and the second electrosorption electrode, especially at least 1 k$\Omega$, or preferably 1 M$\Omega$, or a physical open circuit, or wherein either (b) the electrical current between the first electrosorption electrode and the second electrosorption electrode is controlled to substantially zero (for instance by applying a potential equal to the "open cell" voltage), and wherein the decalcifying apparatus optionally further comprises a voltage meter, configured to measure "open cell" voltage, being a measure for the capacity of the electrosorption cell (and/or the rechargeable battery) during at least part of the idle stage. Hence, in a specific embodiment, the decalcifying apparatus is configured to operate during part of its operation time in an idle stage, wherein, either (a) an impedance of at least 1 k$\Omega$ between the first electrosorption electrode and the second electrosorption electrode is applied, or wherein (b) a current controller is configured to minimize the current, especially below 1 mA, wherein the decalcifying apparatus further comprises a voltage meter, configured to measure the capacity of the electrosorption cell unit during at least part of the idle stage.

When the electrosorption cell is in a virgin state, there may be no potential difference. However, when the electrodes of the electrosorption cell are charged with ions, a potential difference may be measured. Hence, this potential difference may be a measure of the (remaining) capacity of the electrosorption cell (herein also indicated as "capacity of the treatment section"). The signal of such voltage meter may thus be used as input for determining (by a control unit) whether regeneration should be commenced. The term "voltage meter" may also refer to a plurality of voltage meters.

In a further embodiment, the electrosorption apparatus may further include a switching unit. The switching unit is especially configured to switch between the regeneration stage and the purification stage, and optionally also other stages. The switching unit may further be configured to switch (thereby) the sign of the voltage applied. The switching unit may be comprised by the control unit. Especially, the switching unit may be controlled by the control unit.

As already indicated above, the apparatus may further include a control unit. In an embodiment, the control unit may (amongst others) be configured to control one or more of (i) the potential difference between the first electrosorption electrode and the second electrosorption electrode and (ii) the current through the treatment section, as function of one or more of (a) a battery status, (b) capacity of the treatment section, (c) a parameter representative of an ion concentration in the aqueous liquid, and (d) a mass rate of liquid processed by electrosorption cell. Hence, the potential difference over the electrosorption cell and/or the current through the electrosorption cell may be controlled, amongst others in dependence of the three herein indicated features. For instance, the control unit may switch (for instance by using the switching unit) from regeneration to purification (i.e. at least switch sign) when the electrosorption cell is fully regenerated. The status of the battery may also be relevant, as the regeneration may have to be terminated when the rechargeable battery is substantially discharged. Further, when e.g. relative pure water is available in the treatment section, the potential difference over the electrosorption cell and/or current through the electrosorption cell can be low, or even zero, whereas when e.g. hard water is provided, the voltage and current may be relatively high. The parameter representative of an ion concentration may e.g. be evaluated by one or more of a conductivity sensor, ion selective electrode or pH meter.

In yet a further embodiment, the control unit may (alternatively or additionally) be configured to switch the decalcifying apparatus to the regeneration stage as function of one or more of (a) capacity of the treatment section, (b) the time of the day, (c) the day of the week, (d) (a) fluid level(s) in one or more of an inlet reservoir, a waste reservoir and a purified water reservoir, and (e) artificial intelligence of the control unit on use of the decalcifying apparatus gathered during the operation of the decalcifying apparatus. As indicated above, the capacity of the treatment section may be an important parameter to determine whether to switch (for instance by using the switching unit) from the regeneration stage to the purification stage and vice versa. As also indicated above, this capacity may e.g. be measured during an idle stage, i.e. where the appliance comprising the apparatus (see further also below) is e.g. temporarily not needed. Further, the regeneration stage may e.g. be executed during the night in an office (where no night shifts are working), or other times of the day wherein the apparatus is not needed for purification, to be ready again during working hours. Likewise, e.g. weekend days or bank holidays may be used to (additionally) regenerate the electrosorption cell, to be ready again during working days.

Hence, the control unit may execute the herein indicated control functions while using the switching unit.

It appears advantageous when one or more of the electrodes further comprises an ion selective membrane. This may inhibit deposition of ions during regeneration. Hence, in a specific embodiment the first electrosorption electrode arrangement comprises said first electrosorption electrode and a first ion selective membrane, and the second electrosorption electrode arrangement comprises said second electrosorption electrode and a second ion selective membrane, wherein one of the first ion selective membrane and the second ion selective membrane is selective for one or more cations and wherein the other is selective for one or more anions. During purification the anode may attract negative ions; hence the anode may include an ion selective membrane, selective for negative ions, especially at least selective for e.g. $HCO_3^-$ and/or $Cl^-$, and especially not selective (i.e. no membrane function but blocking function) for cations such as $Na^+$ and/or $Ca^{2+}$). Hence, the opposite electrode, the cathode, may especially include an ion selective membrane, selective for positive ions, especially at least selective for e.g. $Na^+$ and/or $Ca^{2+}$), and especially not selective (i.e. no membrane function but blocking function) for anions such as $HCO_3^-$ and/or $Cl^-$. Especially, the respective ion selective membranes are in physical contact with the respective electrosorption electrode.

As indicated above, the electrosorption cell may further include an ion generating element. The ion generating element during the regeneration phase may (when interposed) be configured to substantially block recombination between ions desorbed from the respective (facing) first and second electrosorption electrodes and may be configured to generate hydrogen and hydroxide ions, especially thereby maintaining charge balance with these desorbed ions. Hence, the term "interposed" especially indicates that the water splitting membrane (the ion generating element) is configured between the first electrode arrangement, more especially the first electrosorption electrode, and second electrode arrangement, more especially the second electrosorption electrode. Due to the interposed electrode, a direct (linear) migration of ions from one electrode to the other may not be possible. Hence, the ion generating element may be configured to at least partially fluidically isolate the aqueous liquid at the first electrosorption electrode side of the electrolytic cell and the aqueous liquid at the second electrosorption electrode side of the electrolytic cell. Therefore, the ion generating element may especially be configured to at least partially fluidically isolate the first electrode arrangement from the second electrode arrangement.

Hence, in yet a further embodiment the decalcifying apparatus further comprises a first cell comprising said first electrosorption electrode arrangement, and a second cell comprising said second electrosorption electrode arrangement, wherein the first cell and the second cell are separated by a water splitting membrane or by an electrically floating electrode (see further below). Herein, the electrosorption cell refers to a cell comprising two electrodes as described herein. Such electrosorption cell may thus optionally be divided in two cell parts, here indicated as first cell and second cell, which may be separated by the ion generating element, such as a water splitting membrane or an electrically floating electrode.

Hence, the ion generating element may comprise a water-splitting membrane.

Especially, the water-splitting membrane may be configured interposed (between the electrosorption electrodes, but not in physical and electrical contact with any of them). The water-splitting membrane generates hydrogen cations and hydroxide anions by auto-ionisation of water and therefore this arrangement prevents the formation of gas during the second operating condition, for example the formation of chlorine gas and hydrogen and oxygen gas which may be formed during electrolysis of water.

The water-splitting membrane may comprise an anion exchange membrane and a cation exchange membrane. With this arrangement, in the second operating condition, the anion exchange membrane allows hydroxide ions to pass through it towards the first electrode arrangement and the cation exchange membrane allows hydrogen ions to pass through it towards the second electrode arrangement. Therefore, the efficiency of the electrolytic cell section is maximised.

The water-splitting membrane may comprise an exchange membrane flow space (or spacer) between the anion exchange membrane and the cation exchange membrane. With this arrangement the flow spacer element provides space between the exchange membranes for untreated aqueous solution containing ions. This can contribute to the conductivity, and so lower the voltage drop over the water-splitting membrane. In such instance, there may be three volumes (and/or flows) of aqueous solution.

The water-splitting membrane may further comprise a proton conducting material between the anion exchange membrane and the cation exchange membrane. With this arrangement the proton conducting material between the exchange membranes may facilitate the transport of hydrogen ions between the membranes, lowering the voltage drop over the water-splitting membrane. The proton conducting material typically consists of polyaromatic polymers, partially fluorinated polymers or perfluorinated polymers, e.g. like Nafion.

The ion generating element may not be electrically connected. Therefore, the apparatus is simplified. Hence, the ion generating element may be a floating electrode. As indicated above, the ion generating element may be configured to divide the electrolytic cell unit in two parts, which (division) may especially be useful during regeneration. As the ion generating element does not need to be electrically connected, the construction—and thus production—of the apparatus may be greatly simplified. It surprisingly appears that with such floating electrode, efficient regeneration may be executed. Without externally providing a current to the ion generating element, ions are generated, as the floating electrode is configured in between (at least part of) the first electrode arrangement and second electrode arrangement. The floating electrode may (substantially) ensure that equal amounts of hydrogen cations and hydroxide anions are created, thereby (substantially) ensuring that the overall pH of the combined solutions in the electrolytic cell remains unaffected.

Optionally, the ion generating element is configured movable relative to the electrodes (or vice versa), allowing a first configuration wherein the ion generating element is not (entirely) interposed during the purification stage, and a second configuration wherein the ion generating element is (entirely) interposed between the electrodes during the regeneration stage. Hence, in embodiments the ion generating element is configured to be absent from the electrolytic cell section in the first operating condition, or the ion generating element is interposed in the electrolytic cell section in the first operating condition. In a specific embodiment, a decalcifying apparatus according to one aspect of the present invention is characterised in that the ion generating element is interposed in the electrolytic cell section (or electrolytic cell unit) only in the second operating condition. In yet another embodiment, a decalcifying apparatus according to one aspect of the present invention is characterised in that the ion generating element is interposed always in the electrolytic cell section (or electrolytic cell unit). Alternatively, the ion generating element may be interposed in the electrolytic cell section in the first operating condition. Hence, the ion generating element may also be a stationary configured body. The ion generating element may be an interposed electrode. Hence, especially, the electrode, as embodiment of the ion generating element, may be configured interposed (between the electrosorption electrodes, but not in physical and electrical contact with any of them). The interposed electrode may be formed from carbon and/or titanium. The surface area of the interposed electrode may be less than the surface area of each of the first electrode arrangement and second electrode arrangement. This arrangement may help to ensure that the electrolysis reactions occur on the interposed electrode and not on the first electrode arrangement and second electrode arrangement. The ion generating element may be configured to be absent from the electrolytic cell section in the first operating condition.

In a further embodiment, the treatment section comprises said first treatment section opening and a second opening wherein the treatment section is configured as flow-through cell. Hence, the decalcifying apparatus as defined herein may comprise an electrolytic cell unit comprising the first electrode arrangement and the second electrode arrangement, and further optionally comprising an inlet for receiving said aqueous solution and an outlet for releasing said aqueous solution, wherein the electrolytic cell unit is especially configured as flow-through unit. When a separate inlet and outlet are applied, the apparatus may be configured to flow the aqueous solution between the first electrode arrangement, more especially the first electrosorption electrode, and the second electrode arrangement, more especially the second electrosorption electrode. Especially, the electrode arrangements may be configured parallel to each other. Yet more especially, the electrosorption electrodes are configured parallel to each other. In this way, the aqueous solution may flow between the electrode arrangements or electrosorption electrodes, respectively, entering the electrolytic cell unit at the opening and leaving at the outlet (depleted in ions (purified) or enriched in ions (regeneration mode)).

As indicated above, the decalcifying apparatus may include a plurality of electrosorption cell units, e.g. to increase capacity and/or to allow parallel purification and regeneration. Hence, in a further embodiment the decalcifying apparatus comprises a plurality of electrosorption cell units, wherein the decalcifying apparatus is configured to purify the aqueous liquid in a first electrosorption cell unit and regenerate a second electrosorption cell unit simultaneously during at least part of the operation time of decalcifying apparatus, and wherein the decalcifying apparatus is further configured to alternate purification stages and regeneration stages of the respective electrosorption cell units. The decalcifying apparatus is especially configured to operate during part of its operation time in a purification stage wherein a first DC potential difference between the first electrosorption electrode and the second electrosorption electrode of one or more of the (plurality of) electrosorption cell units is applied using one or more of (i) the DC power supply and (ii) the rechargeable battery.

A rechargeable battery is a type of electrical battery which can be charged, discharged into a load, and recharged many times. A rechargable battery may comprise one or more of a lead-acid (rechargeable) battery, a nickel cadmium (NiCd) (rechargeable) battery, a nickel metal hydride (NiMH) (rechargeable) battery, a lithium ion (Li-ion) (rechargeable) battery, and a lithium ion polymer (Li-ion polymer) (rechargeable) battery.

The decalcifying apparatus may advantageously be applied in all kind of electronic domestic appliances that use water. An electronic domestic appliance may especially be defined as a piece of electrical equipment used in the home, especially in the kitchen. Domestic appliances may, however, also be used in offices. In general, domestic appliances are not industrial appliances, but include relative small units, including e.g. portable units. Examples of electronic domestic appliances may comprise for instance one selected from the group consisting of a floor steam cleaner, a food steamer, a kettle, a coffee maker, an espresso maker, a tea maker, a water carbonator, a water softener, a water purifier, a steam iron (such as a system iorn), and an air humidifier. Hence, in a further aspect the invention provides an electronic domestic appliance comprising the decalcifying apparatus as defined herein, wherein the electronic domestic appliance comprises an electronic connector for connecting to an external AC power source, wherein the electronic connector is functionally coupled with the DC power supply, the electronic domestic appliance further comprising a first appliance opening in fluid connection with the first treatment section opening, for introduction of aqueous liquid to the electronic domestic appliance, and a functional element wherein purified aqueous liquid is applied and/or stored.

Especially, the electronic domestic appliance may further comprise one or more of (i) an inlet reservoir for storage of the aqueous liquid, the inlet reservoir configured in fluid connection with the first appliance opening and the first treatment section opening, and (ii) a waste reservoir for storage of aqueous liquid produced during the regeneration stage, the waste reservoir configured in fluid connection with the treatment section. This may allow e.g. a cordless application, such as a system iron etc. Alternatively or additionally, the electronic domestic appliance may further comprise a storage or reservoir for purified aqueous liquid.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-5b schematically depict some variants of the decalcification apparatus.

The schematic drawings are not necessarily on scale.

DETAILED DESCRIPTION OF THE EMBODIMENTS

Figure 1A:
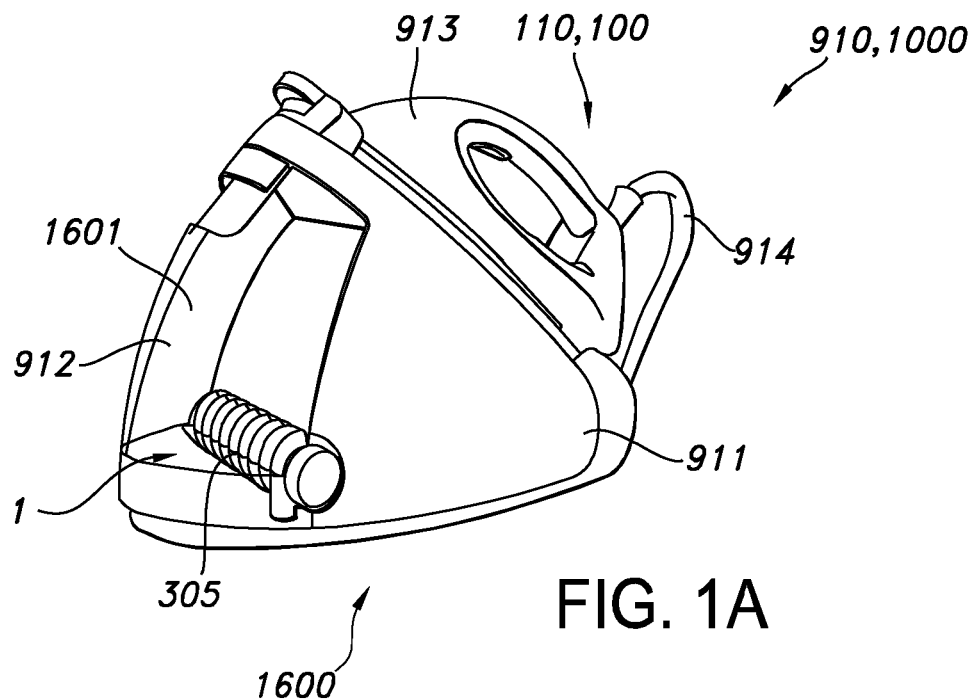
FIG. 1a schematically shows a steam system iron with a decalcifying apparatus.

Referring to FIG. 1a, there is shown a steam system iron 910 as example of an electronic domestic appliance 1000.

The steam system iron 910 comprises a base unit 911, an inlet reservoir 912 in the base unit 911, acting as a fluid reservoir, and a hand-held ironing unit 913. The inlet reservoir 912 is configured to hold an untreated aqueous solution, such as tap water, to be fed to a steam generator (not shown) in the base unit 911. The steam generator converts the fed aqueous solution to steam, which is fed to the ironing unit 913 through a hose 914. Alternatively, the steam generator (not shown) may be in the ironing unit 913. The ironing unit 913 is positionable against the fabric of a garment to emit steam onto the garment. Therefore, the fabric of a garment can be pressed and steamed.

The steam system iron 910 comprises a decalcifying apparatus 1. A detailed description of the decalcifying apparatus 1 will follow. The decalcifying apparatus 1 is disposed between the inlet reservoir 912 and the steam generator. The decalcifying apparatus 1 comprises an inlet communicating with the inlet reservoir 912, a treatment section 305 and a treated aqueous solution section (not shown). The treatment section 305 is between the inlet reservoir 912 and the treated aqueous solution section. Alternatively, the treatment section 305 is disposed in, adjacent to or spaced from the inlet reservoir 912. The treatment section 305 is in fluid communication with aqueous solution in the inlet reservoir 912. An untreated aqueous solution received in the inlet reservoir 912 is fed through the treatment section 305 where it is treated. The treated aqueous solution is then fed from the treatment section 305 to a treated aqueous solution section. In this embodiment, the treated aqueous solution section is a steam generator (not shown) or a fluid passageway leading to a steam generator. However, in an alternative embodiment, the treated aqueous solution section is a fluid outlet from the treatment section 305, including but not limited to, a fluid passageway such as a pipe, or a hose, or a fluid vessel such as a tank.

Although in FIG. 1 a steam system iron 910 is shown, the decalcifying apparatus 1 may be used with alternative garment care apparatus, or entirely other domestic appliances (such as mentioned herein). For example, the decalcifying apparatus may be used with a steam iron or a garment steamer. An advantage of using a decalcifying apparatus 1 in a garment care apparatus, for example, is that the decalcifying apparatus 1 is able to act as a preventative measure to restrict calcification in the steam generator. This allows the steam generator to be designed without the need to account for calcification over time. Therefore, the size of steam generator may be minimised. Furthermore, scales will not be produced and will not be emitted towards garments being treated.

Reference 1600 refers to a storage or reservoir of a functional element using and/or storing purified aqueous liquid 1601. Here, the functional element may especially be the steam generator.

The decalcifying apparatus 1 is not limited to use with garment care apparatus. It is envisaged that the decalcifying apparatus 1 may be integrated into domestic appliances including, but not limited to, a floor steam cleaner, a food steamer, a kettle, a coffee maker, an espresso maker, a tea maker, a water carbonator, a water softener, a water purifier, an air humidifier, etc. The use of the decalcifying apparatus 1 in kettles and coffee makers may help to minimise maintenance and to prevent scales ending up in hot beverages. The treated aqueous solution can also be used in preparation of baby milk from powder to help reduce stress on the baby's kidneys, and to make soybean milk by aiding in the extraction of protein. In addition, it is envisaged that the decalcifying apparatus 1 may be used in conjunction with the kitchen sink water supply or for whole house water decalcifying applications.

The decalcifying apparatus is in general indicated with reference 5. For the sake of clarity, in some figures (and claims) the apparatus is numbered alternatively.

Figure 1B:
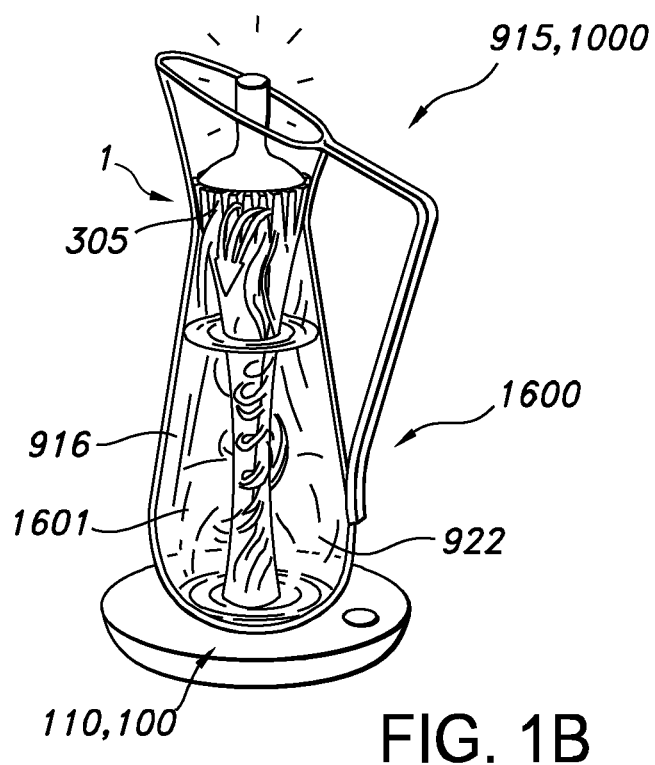
FIG. 1b schematically shows a water jug with a decalcifying apparatus.

For example, referring to FIG. 1b, there is shown a water jug 915, as example of an electronic domestic appliance 1000, comprising a chamber 916 and a treatment section 305. The treatment section 305 is in the chamber 916 for an aqueous solution. In this embodiment, the chamber 916 acts as both the inlet reservoir and treated aqueous solution section. The untreated aqueous solution is fed into the treatment section 305 through a fluid passageway (not shown) where it is partially treated and expelled back into the chamber 916 through another fluid passageway (not shown). The partially treated aqueous solution is then fed back into treatment section 305 and continues to be recirculated until it is treated to the desired level. Reference 922 refers to a chamber, acting as a treated aqueous solution section. This storage may comprise purified aqueous liquid 1601, which is consumed by this water jug appliance.

Figure 2B:
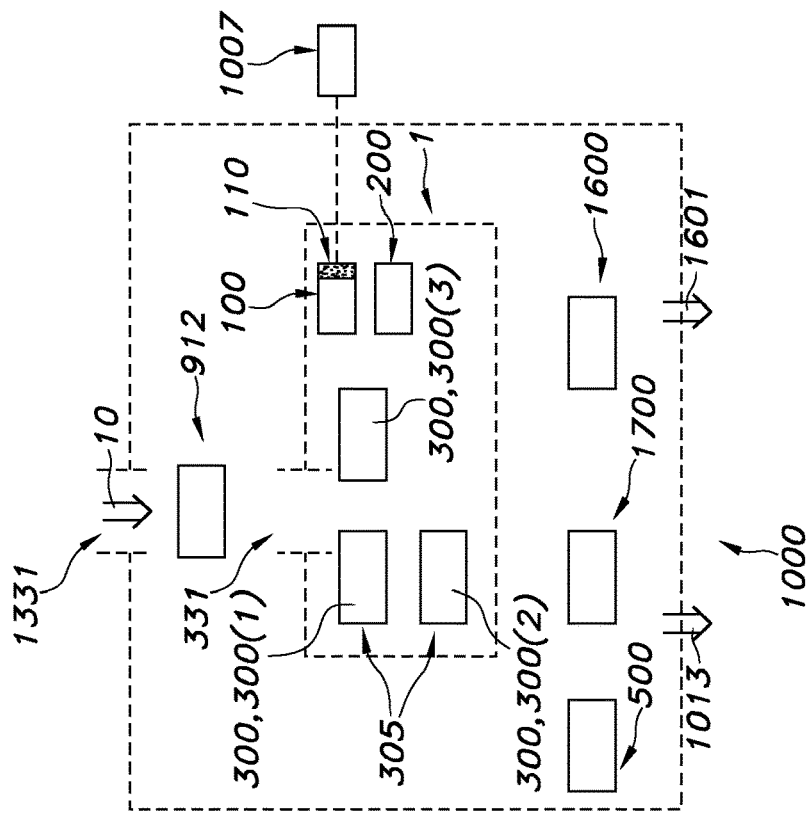
FIGS. 2a-2b schematically depict some aspects of the invention
Figure 2A:
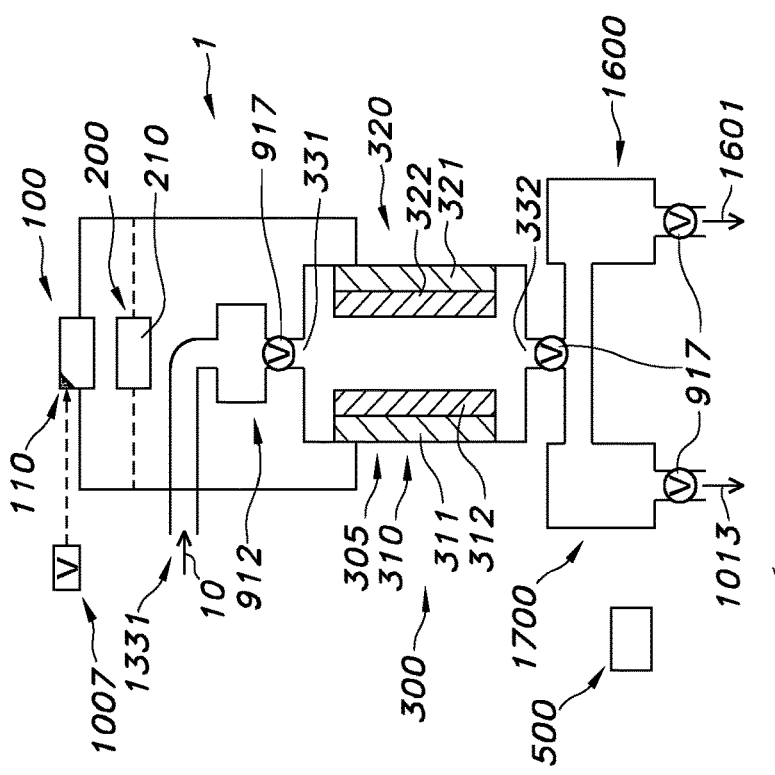

FIG. 2a schematically depicts an embodiment of a decalcifying apparatus 1 configured to decalcify an aqueous liquid 10. The decalcifying apparatus 1 comprises a DC power supply 100 configured to convert AC power from an external AC power source into DC power. The external power source is schematically indicated with reference 1007. The dashed line indicates a possible (cord including) connection. Reference 110 indicates a connector for function connection with the external AC power source 1007.

Further, the apparatus 1 comprises a battery unit 200 comprising a rechargeable battery 210. With the dashed lines, it is amongst others indicated that the decalcifying apparatus 1 may be configured to charge the rechargeable battery 210 via the DC power supply 100 during at least part of a purification stage.

Yet further, the apparatus 1 comprises an electrosorption cell unit 300 comprising a treatment section 305 for said aqueous liquid 10. The treatment section 305 comprises a first electrosorption electrode arrangement 310 comprising a first electrosorption electrode 311. The treatment section 305 also comprises a second electrosorption electrode arrangement 320 comprising a second electrosorption electrode 321. The respective electrosorption electrode arrangements and electrodes, are especially facing each other, and may especially be configured parallel to each other, respectively. Further, the treatment section 305 comprises a first treatment section opening 331 for introduction of the aqueous liquid 10. References 917 schematically indicate valves.

As indicated above, especially the decalcifying apparatus 1 is configured to operate during part of its operation time in a purification stage wherein a first DC potential difference between the first electrosorption electrode 311 and the second electrosorption electrode 321 is applied using one or more of (i) the DC power supply 100 and (ii) the rechargeable battery 210. Yet further, the decalcifying apparatus is configured to operate during part of its operation time in a regeneration stage wherein (a) a DC potential difference between the first electrosorption electrode 311 and the second electrosorption electrode 321 is applied using the rechargeable battery 210, wherein the second DC potential difference has a sign opposite of the first DC potential difference, or (b) wherein the first electrosorption electrode 311 and the second electrosorption electrode 321 are electrically short circuited.

In this schematically depicted embodiment, the decalcifying apparatus 1 further comprises a control unit 500, e.g. configured to control one or more of (i) the potential difference between the first electrosorption electrode 311 and the second electrosorption electrode 321 and (ii) the current through the treatment section 305, as function of one or more of (a) a battery status, (b) capacity of the treatment section 305, (c) a parameter representative of an ion concentration in the aqueous liquid 10, and (d) the mass rate at which the aqueous liquid is treated.

Further, in this schematically depicted embodiment the first electrosorption electrode arrangement 310 comprises said first electrosorption electrode 311 and a first ion selective membrane 312, and the second electrosorption electrode arrangement 320 comprises said second electrosorption electrode 321 and a second ion selective membrane 322. Especially, one of the first ion selective membrane 312 and the second ion selective membrane 322 is selective for one or more cations and wherein the other is selective for one or more anions.

Further, as can be seen, in this embodiment the treatment section 305 comprises said first treatment section opening 331 and a second opening 332 wherein the treatment section 305 is configured as flow-through cell. Reference 912 indicates an inlet reservoir; reference 1600 indicates a storage (or reservoir) of functional element storing or using a purified aqueous liquid 1601. Reference 1700 indicates a storage for waste liquid. Further, reference 1013 indicates waste aqueous liquid, i.e. the aqueous liquid 10 enriched with cations and anions after a regeneration stage. Reference 1331 indicates an appliance opening of an appliance 1000 comprising said electrosorption apparatus 1.

FIG. 2b schematically depicts an embodiment of an electronic appliance 1000. The electronic domestic appliance 1000 comprising the decalcifying apparatus 1 according to any one of the preceding claims, wherein the electronic domestic appliance 1000 comprises an electronic connector 110 for connecting to an external AC power source, wherein the electronic connector 110 is functionally coupled with the DC power supply 100, the electronic domestic appliance 1000 further comprising a first appliance opening 1331 in fluid connection with the first treatment section opening 331, for introduction of aqueous liquid 10 to the electronic domestic appliance 1000, and a functional element 1600 wherein purified aqueous liquid 10 is applied and/or stored.

Here, by way of example the decalcifying apparatus 1 further comprises a plurality of electrosorption cell units 300, indicated with references 300(1), 300(2), . . . , Here, by way of example a series and parallel arrangement is shown with cell units 300(1), 300(2) and 300(3). In specific embodiment, the decalcifying apparatus 1 may be able to purify the aqueous liquid 10 in a first electrosorption cell unit 300(1) and regenerate a second electrosorption cell unit (300(3)) simultaneously during at least part of the operation time of decalcifying apparatus 1 (and vice versa). The decalcifying apparatus 1 may further especially be configured to alternate purification stages and regeneration stages of the respective electrosorption cell units 300.

FIGS. 3a-3b schematically show the purification mode (FIG. 3a) and the regeneration mode (FIG. 3b). Electrosorption electrodes 311,321 are applied. In the regeneration mode, no potential difference is applied and no ion generating element is used. The ions adsorbed in the purification mode are released in the regeneration mode, but calcification may happen inside the electrosorption cell unit 300 during regeneration.

Especially, this embodiment may further comprise ion selective membranes at the electrode surfaces. Hence, in a variant the first electrosorption electrode arrangement 310 comprises said first electrosorption electrode 311 and a first ion selective membrane 312, and the second electrosorption electrode arrangement 320 comprises said second electrosorption electrode 321 and a second ion selective membrane 322. Hence, there is substantially only access to the electrodes 311,321 via the respective ion selective membranes 312,322. In this variant during the regeneration mode a non-zero potential difference may be used with polarity opposite to as used in the purification mode.

FIGS. 4a-4b schematically depict an embodiment according to the invention, such as similar to those of FIGS. 3a-3b. In this schematically depicted embodiment, by way of example with ion exchange membranes 961,962 (which are configured at a distance of the first electrosorption electrode arrangement 310 and the second electrosorption electrode arrangement 320, respectively. Here, the ion exchange membranes 961,962 are configured as ion generating element 370, as during regeneration, the ion exchange membranes split water. Hence, here, the water splitting membrane 942 is used (a "water splitting membrane" or "bipolar membrane" comprises especially the combination of two opposite ion exchange membranes). Advantages of this embodiment are that there is no calcification during cell regeneration and there is no gas formation. Further, the waste volume may be much smaller, as during regeneration flow may be low (or zero). Only for drawing purposes the inter membrane distance in FIG. 4a is larger than in FIG. 4b. Further, note that when the water-splitting membrane, indicated with reference 380, is used, the water-splitting membrane may provide a third volume (or exchange membrane flow spacer), indicated with reference 1142, between the respective two cell parts. The ion exchange membrane 961 may be cation selective, and the ion exchange membrane 962 may be anion selective. The central volume may be in fluidic contact with the output 1600 (or treated aqueous solution selection) during purification and may be in fluidic contact with the waste output 1700 during regeneration.

The height of the electrosorption electrodes 311,321 and the ion generating element 370 is indicated with reference H. The schematically shown embodiments of the electrosorption cell unit 300 show that these all have substantially the same height.

By interposing the ion generating element 370 between the electrode arrangements 310,320, in fact two cells are provided. Hence, the decalcifying apparatus 1 may further comprise a first cell 344 comprising said first electrosorption electrode arrangement 310, and a second cell 345 comprising said second electrosorption electrode arrangement 320, wherein the first cell 344 and the second cell 345 are separated by a water splitting membrane 380 or by an electrically floating electrode (see below).

Figures 5A, 5B:
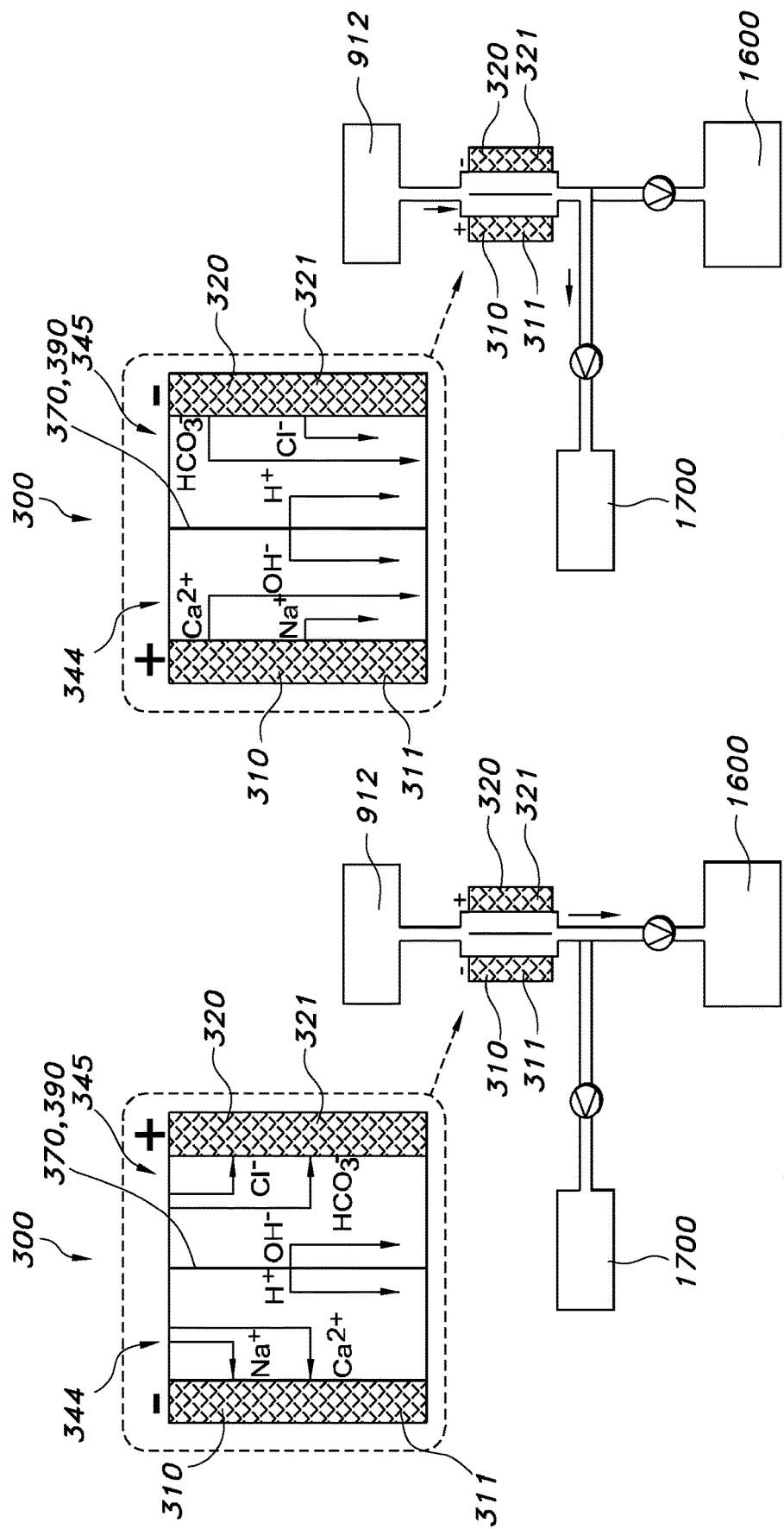

FIGS. 5a-5b schematically depict essentially the same embodiment as schematically depicted in FIGS. 4a-4b, with the exception that instead of the ion exchange membranes 961,962 (i.e. the ion generating element 370) configured between the electrosorption electrodes 311,321 now the ion generating element 370 is an electrode (here a floating electrode 390). This embodiment may have the same advantages as the former embodiment, though some gas formation may occur. A further advantage of this embodiment is that the electrolytic cell may be extremely thin.

Note that all embodiments according to the invention are described and schematically depicted in relation to decalcifying apparatus 1 having a single electrolytic cell unit. However, the invention is not limited to such embodiments. In contrast, the decalcifying apparatus may include a plurality of such cells, including tubing and pumps, thereby allowing a continuous purification of the aqueous solution, while some cells may purify, while others regenerate, while at a later moment this may be reversed, while thus still producing a purified aqueous solution.

Hence, in an embodiment the invention provides amongst others two types of electrodes used in two consecutive stages of electrical driving or in two parallel stages.

In an embodiment, in a first stage (herein also indicated as "purification stage" or "purification mode" or the "filling mode"), under normal (filling) operation, potentials are applied to first and second opposing "electrosorption" electrodes, to store cations in a first electrode (low potential), and anions in a second electrode (high potential). This may ensure that the total ion content of the water passing the two electrodes will be significantly reduced, until the total absorption capacity of first and second electrosorption electrodes is reached. In a second stage (herein also indicated as "regeneration mode" or the "descaling mode"), for descaling maintenance, a third non-electrosorption electrode (with typically only geometric surface area, without porosity) is interposed between first and second electrodes, such that (effectively) two separate cells are formed. The applied potentials are reversed (when the same cell is used as used for the purification stage), with a high potential to the first electrode, a low potential to second electrode and floating potential to the third electrode. Under influence of those potentials, the previously stored cations and anions will be effectively released to their respective cells, and each balanced by $OH^-$ and $H^+$ respectively, that forms by electrolysis reactions occurring at the third non-electrosorption electrode. Consequently, the first cell with the first electrode will become alkaline, converting the released calcium and magnesium ions into solid hydroxide salts. The second cell with the second electrode will become acidic, converting the released bicarbonate ions into $CO_2$ gas, and additionally the released chloride ions at the third electrode will react to chlorine gas. In addition the electrolysis reactions at the third electrode will form hydrogen gas in the first cell and oxygen gas in the second cell.

Would however the regenerating electrosorption cell not have an interposed ion generating body, as described in the present invention, this would imply a inefficient operation. To avoid calcification problems inside the regeneration cell a minimal flow rate has to be maintained, leading to a significant waste volume. Hence, the ion generating body, such as an interposed electrode, provides large advantages over state of the art solutions, and reduces waste formation.

As indicated above, an ion generating body is applied. This ion generating body may comprise a water splitting membrane or simply an electrode (like a Pt plate). The latter is herein also indicated as third electrode. Advantages of this third electrode are:

Effective desorption. Since the dominant species of ions released from the first and second electrosorption electrodes are converted to other species, these desorbed ions do not prohibit the further release of remaining ions.

Cation/Anion exchange membranes in the electrode arrangements in physical contact with the electrosorption electrodes are not required. This is beneficial from cost perspective, but also electrode lifetime can be enhanced by inverting the polarities of first and second electrodes in subsequent purification-regeneration cycles. Without the third electrode, polarity reversal in the regeneration mode, would result in ions releasing from the first electrode being immediately re-absorbed in the second (opposed) electrode, and vice versa. So without a third electrode in between, cation/anion exchange membranes would be required to prevent this opposite re-absorption. Note however that the invention does not exclude cation/anion exchange membranes.

The interposed electrode introduces a large asymmetry in surface area, thereby preventing electrolysis at the electrosorption electrode, even at higher voltages and currents. The surface area of the electrosorption electrodes is especially substantially larger than the surface area of the interposed electrode. This allows faster regeneration of the electrosorption electrode.

Electrolysis reactions create visible recognizable waste. Notably the calcium and magnesium ions in the alkaline cell will form solid calcium/magnesium hydroxide precipitation, that turn the water into a milky fluid. This can be easily recognized by the consumer as a waste, giving credibility to the descaling process.

The present invention allows that the total pH of combined solution volumes at both sides of the interposed ion generating body, such as an electrode, does not become acidic, avoiding potential damage to metal parts in the reservoir and further downstream inside the appliance.

An advantage of a (interposed) water splitting membrane, especially when ion exchange membranes are applied with a space(r) in between, may be that in addition to the above advantages for the (interposed) electrode), gas formation may be reduced or prevented.

In an embodiment, the electrosorption electrodes have a high (internal) surface area to store ions. Preferably these electrodes are made from activated carbon, as conventionally and cost-effectively applied in supercapacitors or capacitive deionisation applications. Surface areas of at least 500 $m^2$/gr, such as at least 1000 $m^2$/gr, are feasible.

In an embodiment, the third interposed electrode has a much smaller (internal) area than the electrosorption electrodes (such as at least 100 times smaller). This may ensure that the electrolysis reactions may only occur on this third electrode (and not at the first and second electrodes). Especially, the electrolysis electrode is made from carbon, for instance injection molded carbon, as conventionally and cost-effectively applied in fuel cells, or glassy carbon, or alternatively from titanium coated with a ruthenium or iridium oxide coating for prolonged lifetime (known in the art as dimensionally-stable-anode DSA).

We have surprisingly found that the third interposed electrode during regeneration does not require an electrical connection. If this third electrode remains unconnected, floating, it will automatically receive a potential in between opposing electrosorption electrodes. An advantage of a floating electrode is that it requires fewer components and allows for more design options. A further advantage of the floating electrode is that equal amounts of hydrogen cations and hydroxide anions are created at opposite sides of this electrodes, thereby ensuring that the overall pH of the combined solutions in the electrolytic cell remains unaffected. An alternative embodiment to the interposed electrode is an interposed bipolar membrane. Similar to the interposed electrode, this bipolar membrane may be inserted only during regeneration (though other embodiments are also possible, such as a permanent interposure, etc.). Also this interposed bipolar membrane does not need an electrical connection. A bipolar membrane may consist of a cation exchange membrane and anion membrane laminated together. During regeneration, especially the cation exchange membrane side should face the negative electrosorption electrode and releases H+ ions. Vice versa the anion exchange membrane side should face the positive electrosorption electrode and releases OH− ions. An additional advantage compared to a metal interposed electrode is that a bipolar membrane generates H+/OH− by auto-ionisation of water, not electrolysis, so hydrogen, oxygen and chlorine gas formation is avoided.

In embodiments, the first and second electrodes can be positioned at the entrance of a water reservoir, but also inside a reservoir. Advantage of the latter is that the capturing of ions is less time critical, for instance in a steam iron the filling operation is expected to take 20 seconds, while the residence time of the water in the reservoir is typically 30 minutes.

In arrangements, the first and second electrosorption electrodes 311,321 are e.g. formed from activated carbon. However it will be understood that other suitable materials may be used. The activated carbon electrode may have a surface area of the order of 1000 $m^2$/g.

Figure 6A:
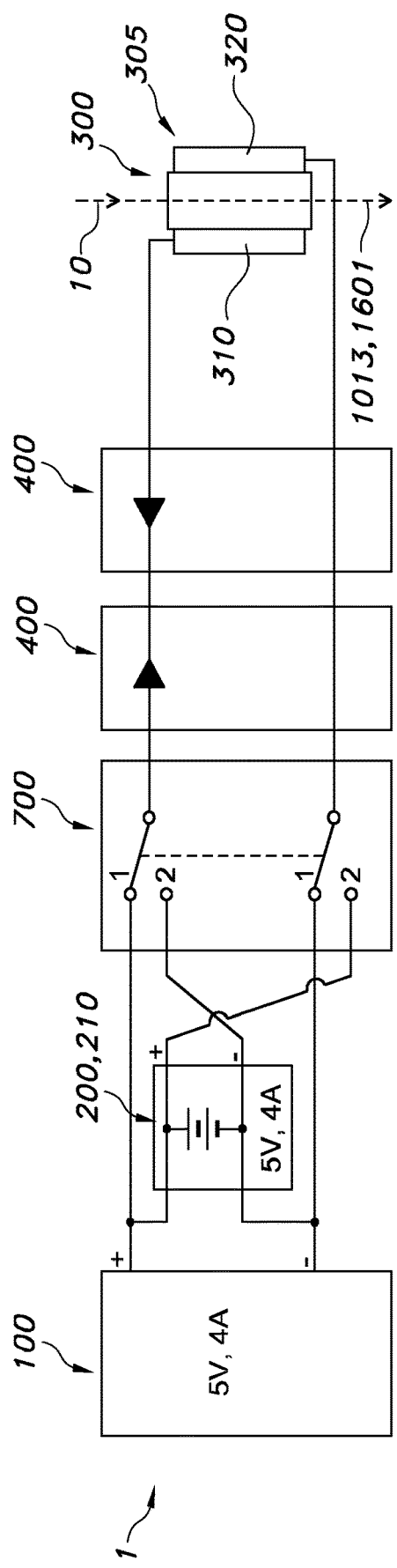
FIGS. 6a-6d schematically depict some variants of the decalcification system.

FIG. 6a very schematically depicts other aspects of the decalcifying apparatus 1 for use in the electronic domestic appliance 1000.

Here, the decalcifying apparatus 1 further comprises, by way of example, a current controller 400 configured to control the current through the treatment section 305 during one or more of (i) the purification stage, and (ii) the regeneration stage. By way of example, two current controllers are depicted, to control currents in both directions.

Further, by way of example the DC power supply 100 is configured to provide e.g. up to 5 V and up to 4 A; likewise, the rechargeable battery may be configured to provide up to 5 V and up to 4 A. reference 700 indicates a switching unit, here configured to allow a regeneration or purification stage (by choosing 1 or 2).

By way of example, a liquid flow is shown which provides the aqueous liquid 10 to the treatment electrosorption cell unit 300, which is converted into purified aqueous solution 1601 and/or waste liquid 1013. Possible flows are schematically depicted in FIGS. 3a-5b. This is a schematic drawing: of course, the purified aqueous solution 1601 and/or waste liquid 1013 flow separate from each other.

Figure 6B:
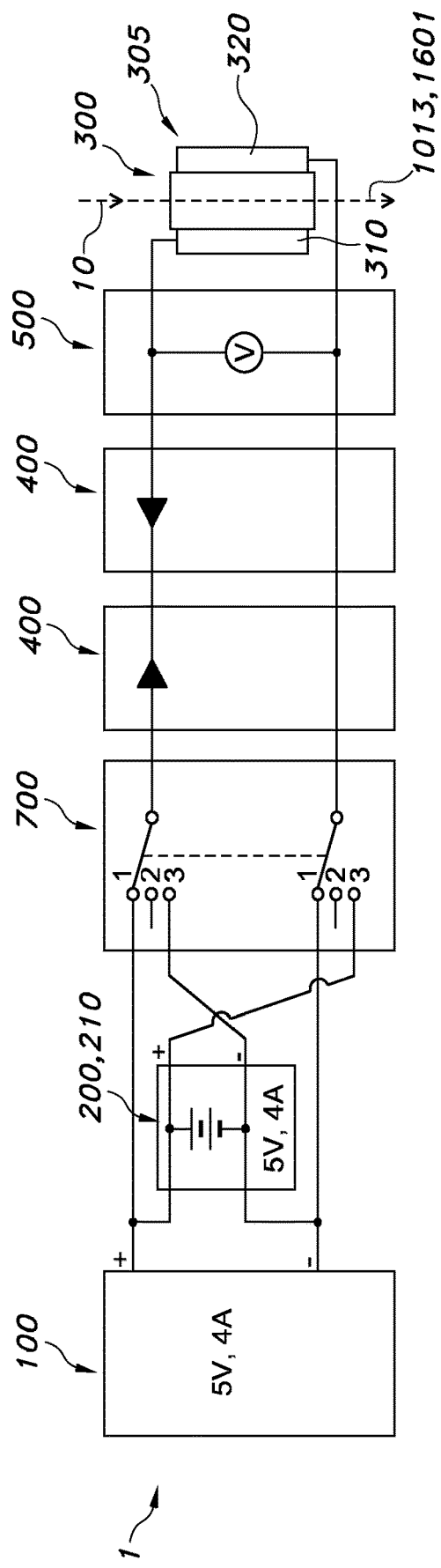

FIG. 6b is substantially the same, but now including a voltage meter 500. Further, the apparatus 1 comprises an additional setting or stage, here indicated with setting 2, which can be indicated as idle stage. Substantially no current is flowing between first and second electrosorption electrodes, which is the proper condition to measure the "open cell" voltage between first and second electrosorption electrodes, being a measure for the remaining capacity of the treatment section of electrosorption cell unit 300. Based on this information a decision to continue the present stage or to switch to another stage (see elsewhere about the control unit and its function) may be taken.

Figure 6C:
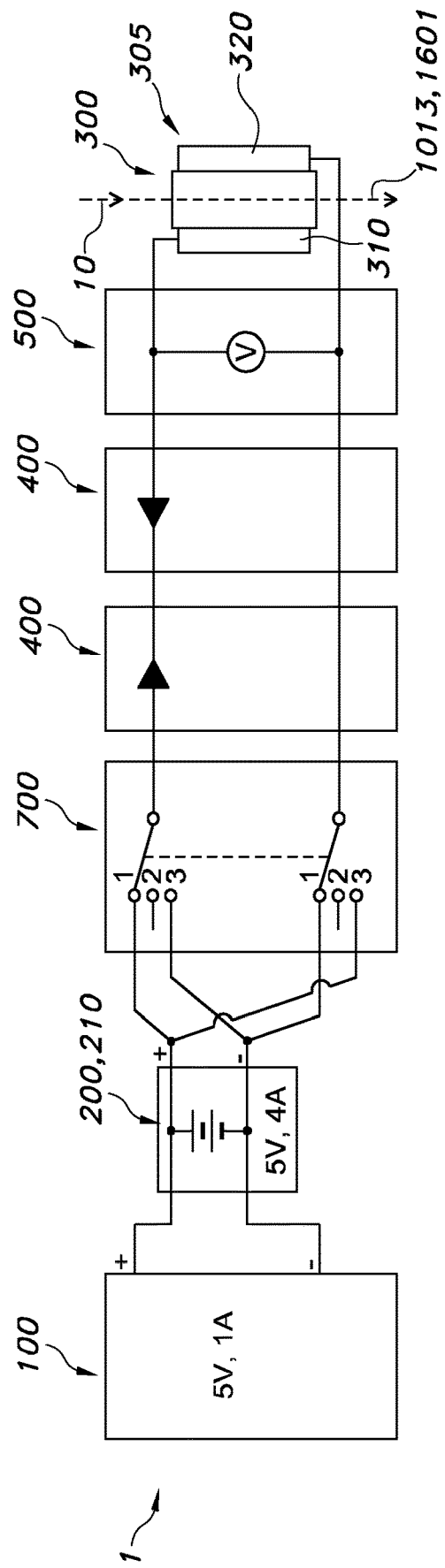

FIG. 6c is a variant that can be used also in the variant of FIG. 6a, but is now depicted in the same configuration as FIG. 6b. Note that the circuit is changed, and that the DC power supply 100 is configured to provide a lower current. During e.g. purification, by way of example setting 1 at the switching unit, the DC power supply 100 and the rechargeable battery 210 are configured parallel (see also FIG. 6a). In this embodiment, the decalcifying apparatus 1 is configured to operate during part of its operation time in said purification stage wherein said first DC potential difference between the first electrosorption electrode 311 and the second electrosorption electrode 321 is applied using the DC power supply 100 and the rechargeable battery 210, wherein the DC power supply 100 is configured to provide a lower current than the rechargeable battery 210.

Figure 6D:
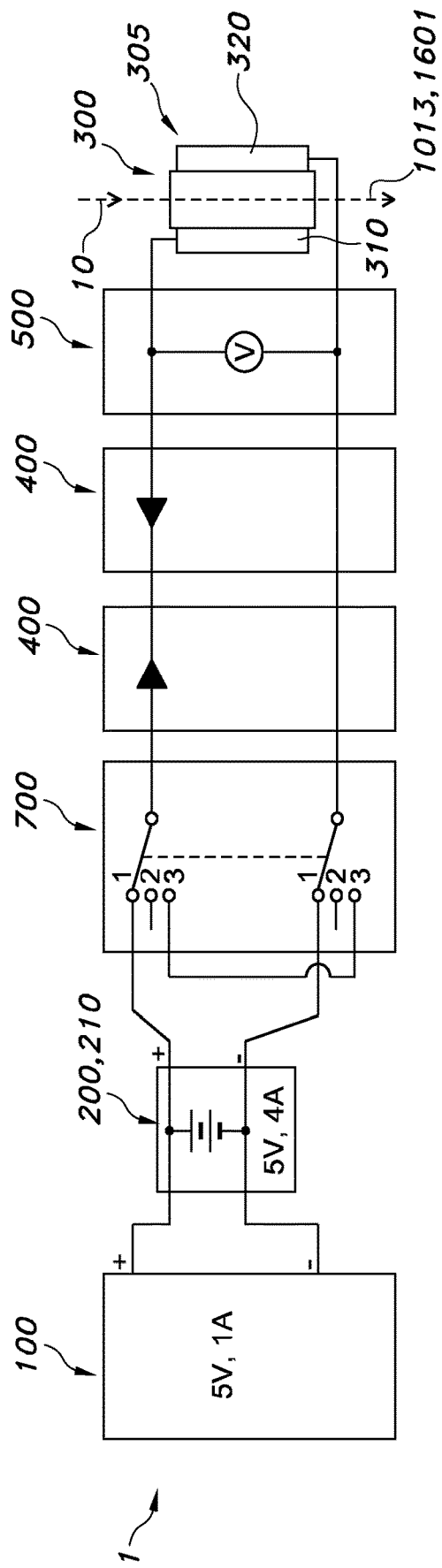

In FIG. 6d an embodiment is chosen where a regeneration stage may include shortcutting the electrodes (option 3 in switching unit). Such embodiment may especially be relevant when the treatment section does not include elements that prevent re-adsorption of ions at the opposite electrode during regeneration.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A decalcifying apparatus configured to decalcify an aqueous liquid, the decalcifying apparatus comprising:
    a DC power supply configured to convert AC power from an external AC power source into DC power;
    a rechargeable battery;
    an electrosorption cell unit comprising a treatment section for the aqueous liquid, wherein the treatment section comprises (a) a first electrosorption electrode arrangement comprising a first electrosorption electrode, (b) a second electrosorption electrode arrangement comprising a second electrosorption electrode, and (c) a first treatment section opening for introduction of the aqueous liquid; and
    at least one controller configured to:
        control the DC power supply to apply a first DC potential difference between the first electrosorption electrode and the second electrosorption electrode, and to charge the rechargeable battery, during a first part of a purification stage for purifying the aqueous liquid,
        control the DC power supply and the rechargeable battery to apply the first DC potential difference between the first electrosorption electrode and the second electrosorption electrode during a second part of the purification stage, such that the rechargeable battery provides part of an electrical current to the treatment section for the second part of the purification stage to meet a power surge, and
        control the rechargeable battery to apply a second DC potential difference between the first electrosorption electrode and the second electrosorption electrode during a regeneration stage when the DC power supply is off, wherein the second DC potential difference has a sign opposite of the first DC potential difference.

2. The decalcifying apparatus according to claim 1, wherein the DC power supply is configured to provide a power supply current that is lower than a battery current provided by the rechargeable battery during the second part of the purification stage.

3. The decalcifying apparatus according to claim 1, wherein during an idle stage, (a) an impedance of at least 1 kΩ between the first electrosorption electrode and the second electrosorption electrode is applied, or (b) the at least one controller is further configured to minimize the electrical current below 1 mA, and wherein the decalcifying apparatus further comprises a voltage meter configured to measure capacity of the electrosorption cell unit during at least part of the idle stage.

4. The decalcifying apparatus according to claim 1, wherein the at least one controller is further configured to control one or more of (i) the first DC potential difference between the first electrosorption electrode and the second electrosorption electrode, (ii) the second DC potential difference between the first electrosorption electrode and the second electrosorption electrode, and (iii) the electrical current through the treatment section, as function of one or more of (a) a status of the rechargeable battery, (b) capacity of the treatment section, (c) a parameter representative of an ion concentration in the aqueous liquid, and (d) mass rate at which the aqueous liquid is treated.

5. The decalcifying apparatus according to claim 1, wherein the first electrosorption electrode arrangement further comprises a first ion selective membrane, wherein the second electrosorption electrode arrangement further comprises a second ion selective membrane, wherein one of the first ion selective membrane and the second ion selective membrane is selective for one or more cations, and wherein the other is selective for one or more anions.

6. The decalcifying apparatus according to claim 1, wherein the electrosorption cell unit further comprises a first cell and a second cell, the first cell comprising said first electrosorption electrode arrangement, the second cell comprising said second electrosorption electrode arrangement, wherein the first cell and the second cell are separated by a water splitting membrane or by a floating electrode.

7. The decalcifying apparatus according to claim 1, wherein the treatment section further comprises a second treatment section opening for flow of the aqueous liquid, and wherein the treatment section is configured as flow-through cell.

8. The decalcifying apparatus according to claim 1, comprising another electrosorption cell unit, wherein the decalcifying apparatus is configured to purify the aqueous liquid in the electrosorption cell unit and regenerate the another electrosorption cell unit simultaneously during at least the first part of the purification stage.

9. An electronic domestic appliance comprising:
the decalcifying apparatus according to claim 1;
an electronic connector for connecting to the external AC power source, wherein the electronic connector is functionally coupled with the DC power supply; and
a first appliance opening in fluid connection with the first treatment section opening, for introduction of aqueous liquid to the electronic domestic appliance, and a functional element, and wherein purified aqueous liquid is used and/or stored.

10. The electronic domestic appliance according to claim 9, comprising one selected from the group consisting of a floor steam cleaner, a food steamer, a kettle, a coffee maker, an espresso maker, a tea maker, a water carbonator, a water softener, a water purifier, a steam iron, and an air humidifier.

11. The electronic domestic appliance according to claim 9, further comprising one or more of (i) an inlet reservoir for storage of the aqueous liquid, the inlet reservoir configured in fluid connection with the first appliance opening and the first treatment section opening, and (ii) a waste reservoir for storage of aqueous liquid produced during the regeneration stage, the waste reservoir configured in fluid connection with the treatment section.

12. A decalcifying apparatus configured to decalcify an aqueous liquid, the decalcifying apparatus comprising:
a DC power supply configured to convert AC power from an external AC power source into DC power;
a rechargeable battery;
a plurality of electrosorption cell units, each of the plurality of electrosorption cell units comprising a treatment section for the aqueous liquid, wherein the treatment section comprises a first electrosorption electrode, a second electrosorption electrode, and a treatment section opening for introduction of the aqueous liquid; and
at least one controller configured to:
control the DC power supply to apply a first DC potential difference between a first electrosorption electrode in a first electrosorption cell unit of the plurality of electrosorption cell units, and a second electrosorption electrode in the first electrosorption cell unit to purify the aqueous liquid in the first electrosorption cell unit, and to charge the rechargeable battery, during a first part of a purification stage,
control the DC power supply and the rechargeable battery to apply the first DC potential difference between the first electrosorption electrode and the second electrosorption electrode during a second part of the purification stage, such that the rechargeable battery provides part of an electrical current for the second part of the purification stage to meet a power surge, and
control the rechargeable battery to apply a second DC potential difference between a first electrosorption electrode in a second electrosorption cell unit of the plurality of electrosorption cell units, and a second electrosorption electrode in the second electrosorption cell unit, during the first part of the purification stage to regenerate the second electrosorption cell unit simultaneously with the first part of the purification stage, wherein the second DC potential difference has a sign opposite of the first DC potential difference.

13. The decalcifying apparatus according to claim 1, further comprising a switching unit configured to switching to a setting during the regeneration stage in which the first electrosorption electrode and the second electrosorption electrode are electrically short circuited.

14. The decalcifying apparatus according to claim 2, wherein the DC power supply is configured to deliver a current that is lower than peak current.

* * * * *